US009613386B1

(12) United States Patent
Arden et al.

(10) Patent No.: US 9,613,386 B1
(45) Date of Patent: Apr. 4, 2017

(54) PICKUP AND DROP OFF ZONES FOR AUTONOMOUS VEHICLES

(71) Applicant: Google Inc., Mountain View, CA (US)

(72) Inventors: Jennifer Arden, Tiburon, CA (US); Brian Douglas Cullinane, Palo Alto, CA (US); Min Li Chan, San Francisco, CA (US); Renaud-Roland Hubert, Gilroy, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/955,769

(22) Filed: Dec. 1, 2015

(51) Int. Cl.
- *G01S 1/24* (2006.01)
- *G06Q 50/30* (2012.01)
- *G01C 21/36* (2006.01)

(52) U.S. Cl.
CPC ......... *G06Q 50/30* (2013.01); *G01C 21/3667* (2013.01)

(58) Field of Classification Search
CPC .................. G01C 21/36; G06Q 50/30
USPC ............. 701/428, 49, 431, 437, 409
See application file for complete search history.

(56) References Cited

U.S. PATENT DOCUMENTS

| | | | | |
|---|---|---|---|---|
| 8,315,796 B2 * | 11/2012 | Yamaguchi | ............ | G01C 21/36 340/995.2 |
| 8,467,962 B2 * | 6/2013 | Irie | ........................ | G09B 29/10 340/995.19 |
| 9,194,168 B1 * | 11/2015 | Lu | ............................ | E05F 15/70 |
| 2004/0148097 A1 | 7/2004 | Mouser et al. | | |
| 2012/0041675 A1 | 2/2012 | Juliver et al. | | |
| 2014/0067488 A1 | 3/2014 | James et al. | | |
| 2014/0380424 A1 * | 12/2014 | Thompson | .............. | G06F 21/31 726/4 |
| 2015/0006005 A1 | 1/2015 | Yu et al. | | |
| 2015/0285650 A1 * | 10/2015 | Lewis | ................ | G01C 21/3407 701/33.7 |

* cited by examiner

*Primary Examiner* — Thomas G Black
*Assistant Examiner* — Luke Huynh
(74) *Attorney, Agent, or Firm* — Lerner, David, Littenberg, Krumholz & Mentlik, LLP

(57) ABSTRACT

Aspects of the disclosure relate to providing information about a vehicle dispatched to pick up the user. In one example, a request for the vehicle to stop at a particular location is sent. In response, information identifying a current location of the vehicle is received. A map is generated. The map includes a first marker identifying the received location of the vehicle, a second marker identifying the particular location, and a shape defining an area around the second marker at which the vehicle may stop. The shape has an edge at least a minimum distance greater than zero from the second marker. A route is displayed on the map between the first marker and the shape such that the route ends at the shape and does not reach the second marker. Progress of the vehicle towards the area along the route is displayed based on received updated location information for the vehicle.

20 Claims, 17 Drawing Sheets

500

600

800

900

1000

1100

PICKUP AND DROP OFF ZONES FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up the user. These services, while useful, generally fail to provide users with real time information about what actions a taxi is taking on the way to pick up the user.

BRIEF SUMMARY

One aspect of the disclosure provides a method. The method includes sending, by a client computing device having one or more processors, a request for a vehicle to stop at a particular location; in response to the request, receiving, by the client computing device, information identifying a current location of the vehicle; generating, by the client computing device, a map for display, the map including a first marker identifying the location of the vehicle, a second marker identifying the particular location, and a shape defining an area around the second marker at which the vehicle may stop, the shape having an edge at least a minimum distance greater than zero from the second marker; displaying, by the client computing device, on a display of the client computing device, a route on the map between the first marker and the shape such that the route ends at the shape and does not reach the second marker; receiving, by the client computing device, updated location information for the vehicle; and displaying, by the client computing device, on the display progress of the vehicle towards the area along the route based on the updated location information.

In one example, the method includes determining a current location of the client computing device and displaying with the map a third marker indicating the current location of the client computing device in order to indicate to a potential passenger the location of the client computing device relative to a pickup location, the area, and the vehicle. In this example, the particular location is a pickup location for the potential passenger. In this example, when the vehicle identifies a pickup spot within the area, the method includes displaying a fourth marker identifying the pickup spot relative to the second marker. In this example, when the progress of the vehicle depicts the vehicle entering the area, the method includes no longer displaying the area. Alternatively, when the vehicle identifies a pickup spot within the area, the method includes shrinking the area on the display towards the fourth marker. In another example, the method includes, when the progress of the vehicle depicts the vehicle at a certain point within the area, increasing the size of the area on the display. In another example, the method includes displaying, in conjunction with the progress, a status indicator indicating whether the vehicle is currently looking for a spot within the area to stop the vehicle. In another example, the method includes displaying, in conjunction with the progress, a status indicator indicating whether the vehicle has found a spot within the area to stop the vehicle. In another example, the method also includes, when the progress of the vehicle depicts the vehicle at a certain point relative to the area, displaying an indication that the vehicle was unable to find a spot within the area to stop, and displaying a new route towards the area.

Another aspect of the disclosure provides an apparatus. The apparatus includes a display and one or more processors. The one or more processors are configured to send a request for a vehicle to stop at a particular location; in response to the request, receive information identifying a current location of the vehicle; generate a map for display, the map including a first marker identifying the location of the vehicle, a second marker identifying the particular location, and a shape defining an area around the second marker at which the vehicle may stop, the shape having an edge at least a minimum distance greater than zero from the second marker; display, on the display, a route on the map between the first marker and the shape such that the route ends at the shape and does not reach the second marker; receive updated location information for the vehicle; and display, on the display, progress of the vehicle towards the area along the route based on the updated location information.

In one example, the one or more processors are also configured to determine a current location of the client computing device and display with the map a third marker indicating the current location of the client computing device in order to indicate to a potential passenger the location of the client computing device relative to a pickup location, the area, and the vehicle. In this example, the particular location is a pickup location for the potential passenger. In addition, the one or more processors are further configured to when the vehicle identifies a pickup spot within the area, display a fourth marker identifying the pickup spot relative to the second marker. In this example, the one or more processors are also configured to, when the progress of the vehicle depicts the vehicle entering the area, no longer display the area. Alternatively, the one or more processors are also configured to when the vehicle identifies a pickup spot within the area, shrink the area on the display towards the fourth marker. In another example, the one or more processors are further configured to, when the progress of the vehicle depicts the vehicle at a certain point within the area, increase the size of the area on the display. In another example, the one or more processors are further configured to display, in conjunction with the progress, a status indicator indicating whether the vehicle is currently looking for a spot within the area to stop the vehicle. In another example, the system also includes the vehicle.

A further aspect of the disclosure provides a non-transitory, tangible, computer readable medium on which instructions are stored. The instructions, when executed by one or more processors, cause the one or more processors to perform a method. The method includes sending a request for a vehicle to stop at a particular location; in response to the request, receiving information identifying a current location of the vehicle; generating a map for display, the map including a first marker identifying the location of the vehicle, a second marker identifying the particular location, and a shape defining an area around the second marker at which the vehicle may stop, the shape having an edge at least a minimum distance greater than zero from the second marker; displaying, on the display, a route on the map between the first marker and the shape such that the route ends at the shape and does not reach the second marker;

receiving updated location information for the vehicle; and displaying, on the display, progress of the vehicle towards the area along the route based on the updated location information.

DETAILED DESCRIPTION

Overview

Figure 1:
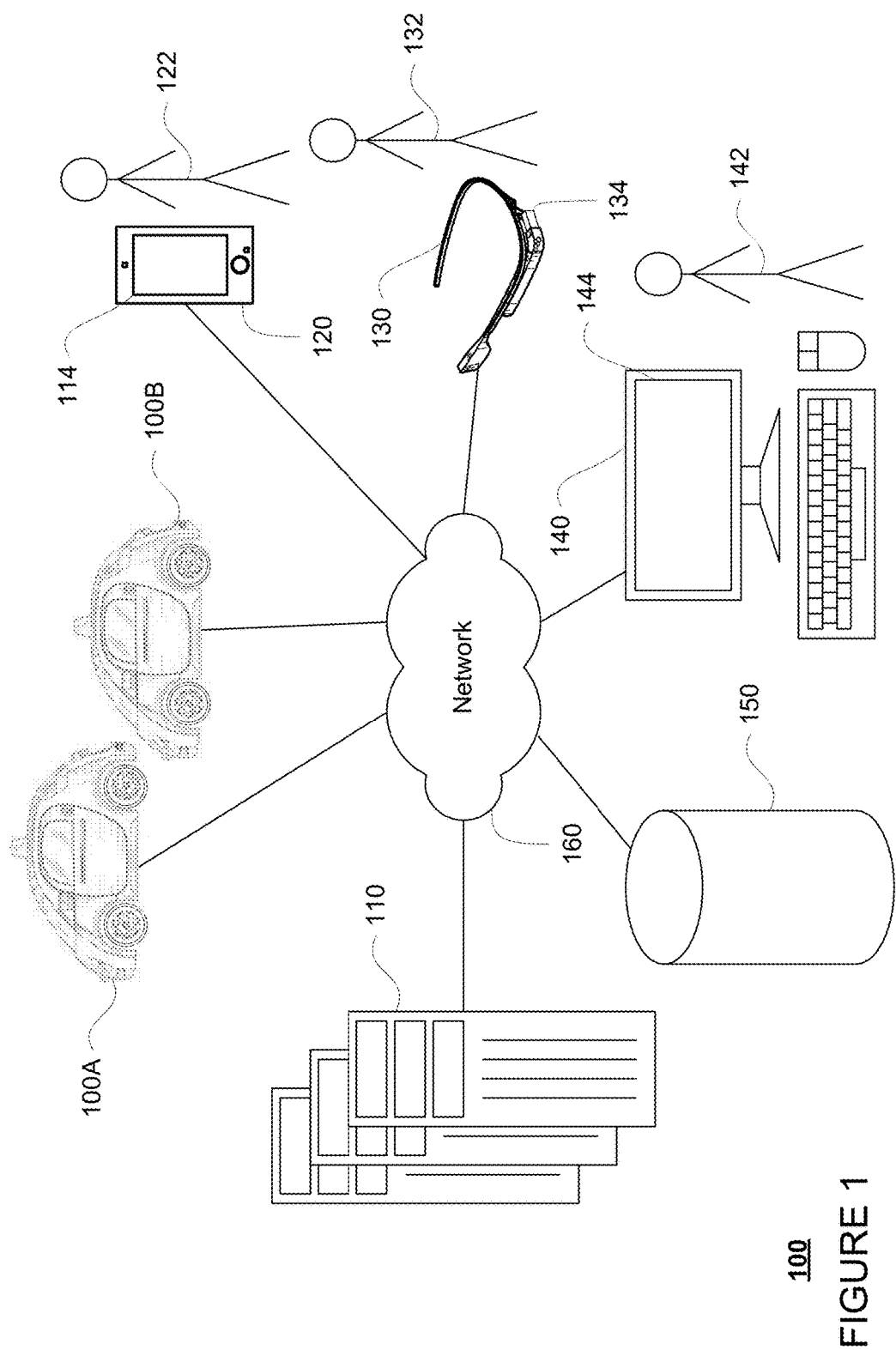
FIG. 1 is a functional diagram of an example system in accordance with an exemplary embodiment.

The technology relates to picking up and dropping off a passenger. This can be an especially tricky problem in situations where the vehicle cannot stop at the exactly specified location. In some systems, a pin may be dropped on a map to specify a pickup or drop off location. For example there may be no parking or available space to pull over, and the car therefore needs to find a location close to the specified location, but not exactly at the location. However when the vehicle is not able to stop at this exact location, it can become confusing to the user where they should meet the vehicle (in the case of a pickup) or where exactly they are being dropped off (in the case of a drop off). In addition, in the case of an autonomous vehicle without a human driver, it can be difficult to communicate a change in a location to the user on such short notice.

When a vehicle is dispatched to a user, the user's client computing device, for example a mobile phone, can show information about where the pickup location will be. Initially, this pickup location can be displayed as a marker on a map. The marker may correspond to a preferred pickup location. An area or zone around the marker corresponding to a predetermined distance from the preferred pickup location indicating to the user where the pickup is likely occur may also be displayed. In addition, the client device can display a path between the vehicle's current location and the pickup zone. A further marker can be used to identify the location of the client device relative to the map.

The predetermined distance is greater than zero and may be defined in distance or travel time. In addition, the predetermined distance may be a radial distance, or simply a distance along a roadway extending away from the pickup location. In one example, the zone may be shown as a shape such as a bubble wherein an edge of the shape is at least the predetermined distance from the pickup location.

However, to make the actual pickup spot appear more flexible, the path can end at the edge of the pickup zone. In other words, the path would not continue into the zone. In addition, by ending the path at the edge of the pickup zone, the client device is able to indicate clearly to the user that he or she may be able to intercept the vehicle at that point and also that the actual pickup location is a fluid concept subject to change according to the current traffic, parking conditions, etc.

To keep the user clued into where the pickup location is most likely to occur, the size of the zone may be increased or decreased. As an example, as the vehicle reaches a certain distance from the pickup zone along the route, the zone may decrease in size. In one example, when the vehicle is looking of a potential spot to stop, the zone may disappear. In this example, when a spot to stop is found, the location may be identified by a new marker which identifies to the user where this new marker is in relation to the marker which indicated the original pickup location.

Alternatively, rather than disappearing, when the vehicle enters the pickup zone, the zone may remain. In this example, the zone may persist, even where the vehicle has passed the pickup location. The zone may also disappear when the vehicle has identified a spot.

In some examples, once a vehicle enters the physical area corresponding to the pickup zone at one edge and as the vehicle approaches or gets close to another edge of the zone, the size of the zone on the user's client device may be increased. This lets the user know that he or she may have to go a bit farther from the desired pickup location, but may still maintain the position of the preferred pickup location within the pickup zone.

In another example, once the vehicle recognizes a potential spot to stop and wait for the user, the zone may start to shrink towards that spot. This indicates to the user that he or she should move towards the center of the shrinking zone rather than towards the preferred pickup location. The shrinking may also occur after the vehicle has begun to park or when the vehicle is actually in the spot.

In some cases, the vehicle will be unable to find a place to stop within the pickup zone. In this case, the zone may remain at its current size, and may circle back around towards the pickup location. While doing so, a route back to the pickup zone may be calculated and displayed to the user and the process may continue as discussed above.

At the same time, the user's phone may display information about what the vehicle is doing or "thinking" in order to further express to the user how the pickup location is changing. For example, if the vehicle is close to leaving the pickup zone and unable to find a spot to park, the client device may indicate that the vehicle needs more time or zone to find a spot to park. Similarly, the client device may indicate when the vehicle has found a spot in which to park.

The aforementioned features may also be useful when a vehicle is attempting to drop off a passenger at a destination. For instance, as the vehicle approaches a destination point, the client device may display a map with a route to the destination identified by a map pin. A zone may be drawn some distance around this map pin in order to identify to the user that the vehicle could potentially stop anywhere within the zone. In some examples, as the vehicle approaches the zone and begins to detect the availability of places for the vehicle to safely stop, the zone may again increase in size. Once the vehicle has identified a location within the zone for the vehicle to stop, the location may be identified by a new marker which identifies to the user where this new marker is in relation to the map pin which indicated the original destination. At the same time, the zone may disappear to indicate to the user that the vehicle is no longer looking for a place to stop.

By changing the size and/or shape of the pickup zone or drop off zone as discussed herein, the user can readily understand that the actual pickup location where the user will meet the car is a fluid and flexible concept. Similarly, by making the "zone" disappear and replacing it with a new marker, the user can easily determine where he or she is relative to the original destination.

Example Systems

Figure 2:
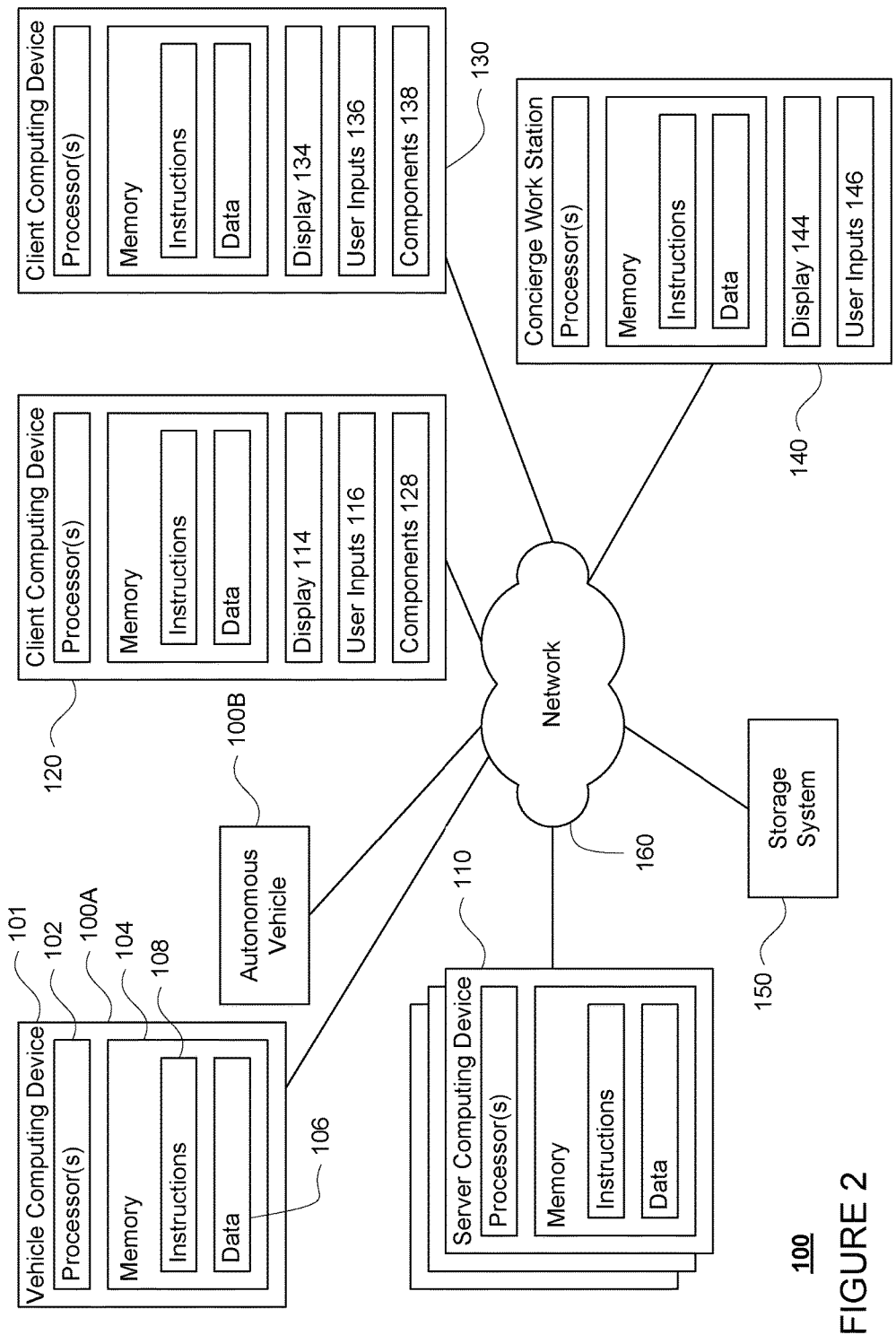
FIG. 2 is a pictorial diagram of the system of FIG. 1 in accordance with aspects of the disclosure.
Figure 3:
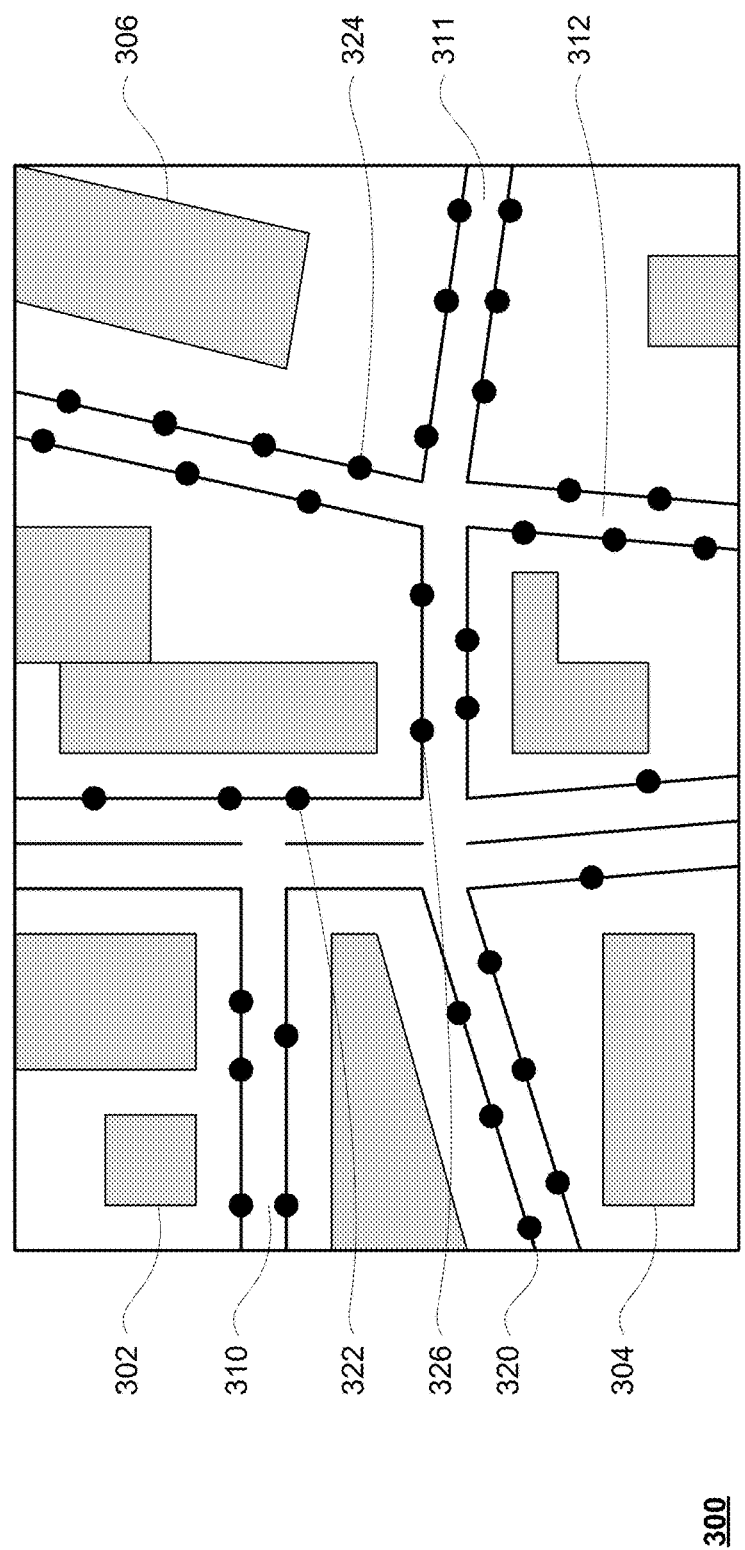
FIG. 3 is an example of detailed map information in accordance with aspects of the disclosure.

As shown in FIGS. 1 and 2, a system 100 in accordance with one aspect of the disclosure includes various components such as vehicles 100A and 100B. While certain aspects of the disclosure are particularly useful in connection with specific types of vehicles, the vehicle may be any type of vehicle including, but not limited to, cars, trucks, motorcycles, busses, recreational vehicles, etc. The vehicles may have one or more computing devices, such as computing device 101 (shown in FIG. 2) containing one or more processors 102, memory 104, data 106, instructions 108 and other components typically present in vehicles having an autonomous driving mode. In this regard, computing device 101 may be an autonomous driving system that can control aspects of vehicle 100A in order to maneuver vehicle 100A for example, between pickup and destination locations. In addition vehicle 100B may be configured the same or similarly to vehicle 100A.

The memory 104 stores information accessible by the one or more processors 102, including instructions 108 and data 106 that may be executed or otherwise used by the processor 102. The memory 104 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 108 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 106 may be retrieved, stored or modified by processor 102 in accordance with the instructions 108. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 102 may be any conventional processors, such as commercially available CPUs. Alternatively, the one or more processors may be a dedicated device such as an ASIC or other hardware-based processor. Although FIG. 2 functionally illustrates the processor, memory, and other elements of the vehicle's computing device 101 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 101. Accordingly, references to a processor or computing device will be understood to include references to a collection of processors or computing devices or memories that may or may not operate in parallel.

Computing device 101 may include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information). In this example, the vehicle includes an internal electronic display as well as one or more speakers to provide information or audio visual experiences. In this regard, an internal electronic display may be located within a cabin of vehicle 100A and may be used by computing device 101 to provide information to passengers within the vehicle 100A.

Computing device 101 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing device 101 of vehicle 100A may also receive or transfer information to and from other computing devices. In this regard, system 100 also includes a plurality of computing devices 110, 120, 130, 140 and a storage system 150 connected via a network 160. As noted above, system 100 also includes vehicle 100B, which may be configured similarly to vehicle 100. Although only a few vehicles and computing devices are depicted for simplicity, a typical system may include significantly more.

As shown in FIG. 2, each of computing devices 110, 120, 130, 140 may include one or more processors, memory, data and instructions. Such processors, memories, data and instructions may be configured similarly to one or more processors 102, memory 104, data 106, and instructions 108 of computing device 101.

The network 160, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 110 may include one or more server computing devices that are capable of communicating with computing device 101 of vehicle 100A or a similar computing device of vehicle 100B as well as computing devices 120, 130, 140 via the network 160. For example, vehicles 100A and 100B may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 110 may use network 160 to transmit and present information to a user, such as user 122, 132, 142 (shown in FIG. 1) on a display, such as displays 114, 134, 144 of computing devices 120, 130, 140. In this regard, computing devices 120, 130, 140 may be considered client computing devices.

As shown in FIG. 1, each client computing device 120, 130, 140 may be a personal computing device intended for use by a user 122, 132, 142, and have all of the components normally used in connection with a personal computing device including one or more processors (e.g., a central processing unit (CPU)), memory (e.g., RAM and internal hard drives) storing data and instructions, a display such as displays 114, 134, 144 (e.g., a monitor having a screen, a touch-screen, a projector, a television, or other device that is operable to display information), and user input devices 116, 136, 146 (e.g., a mouse, keyboard, touch-screen or microphone). The client computing devices may also include a camera for recording video streams, speakers, a network interface device, and all of the components used for connecting these elements to one another.

In addition, the client computing devices 120 and 130 may also include components 128 and 238 for determining the position and orientation of client computing devices. For example, these components may include a GPS receiver to determine the device's latitude, longitude and/or altitude as well as an accelerometer, gyroscope or another direction/speed detection device.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, shown as a head-mounted computing system in FIG. 1. As an example the user may input information using a small keyboard, a keypad, microphone, using visual signals with a camera, or a touch screen.

In some examples, client computing device 140 may be a concierge work station used by an administrator to provide concierge services to users such as users 122 and 132. For example, a concierge 142 may use the concierge work station 140 to communicate via a telephone call or audio connection with users through their respective client computing devices or vehicles 100A or 100B in order to facilitate the safe operation of vehicles 100A and 100B and the safety of the users as described in further detail below. Although only a single concierge work station 140 is shown in FIGS. 1 and 2, any number of such work stations may be included in a typical system.

Storage system 150 may store various types of information as described in more detail below. This information may be retrieved or otherwise accessed by a server computing device, such as one or more server computing devices 110, in order to perform some or all of the features described herein. For example, the information may include routing data for generating and evaluating routes between locations. For example, the routing information may be used to estimate how long it would take a vehicle at a first location to reach a second location. In this regard, the routing information may include map information including roads, as well as information about roads such as direction (one way, two way, etc.), orientation (North, South, etc.), speed limits, as well as traffic information identifying expected traffic conditions, etc. The map information may also include buildings, elevations, fire hydrants, construction zones, real time traffic conditions, etc. from various sources such as governmental institutions, paid informational services, manually entered information, information gathered and provided in real time by autonomous vehicles, etc.

The storage system 150 may also store information which can be provided to client computing devices for display to a user. For instance, the storage system 150 may store predetermined distance information for determining an area at which a vehicle is likely to stop for a given pickup or destination location. The storage system 150 may also store graphics, icons, and other items which may be displayed to a user as discussed below.

As with memory 104, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIGS. 1 and 2 and/or may be directly connected to or incorporated into any of the computing devices 110, 120, 130, 140, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 122 and 132 may download the application via a link in an email, directly from a website, or an application store to client computing devices 120 and 130. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 132 may use client computing device 130 to send a request to one or more server computing devices 110 for a vehicle. As part of this, the user may identify a pickup location, a destination location, and, in some cases, one or more intermediate stopping locations anywhere within a service area where a vehicle can stop.

Figure 4:
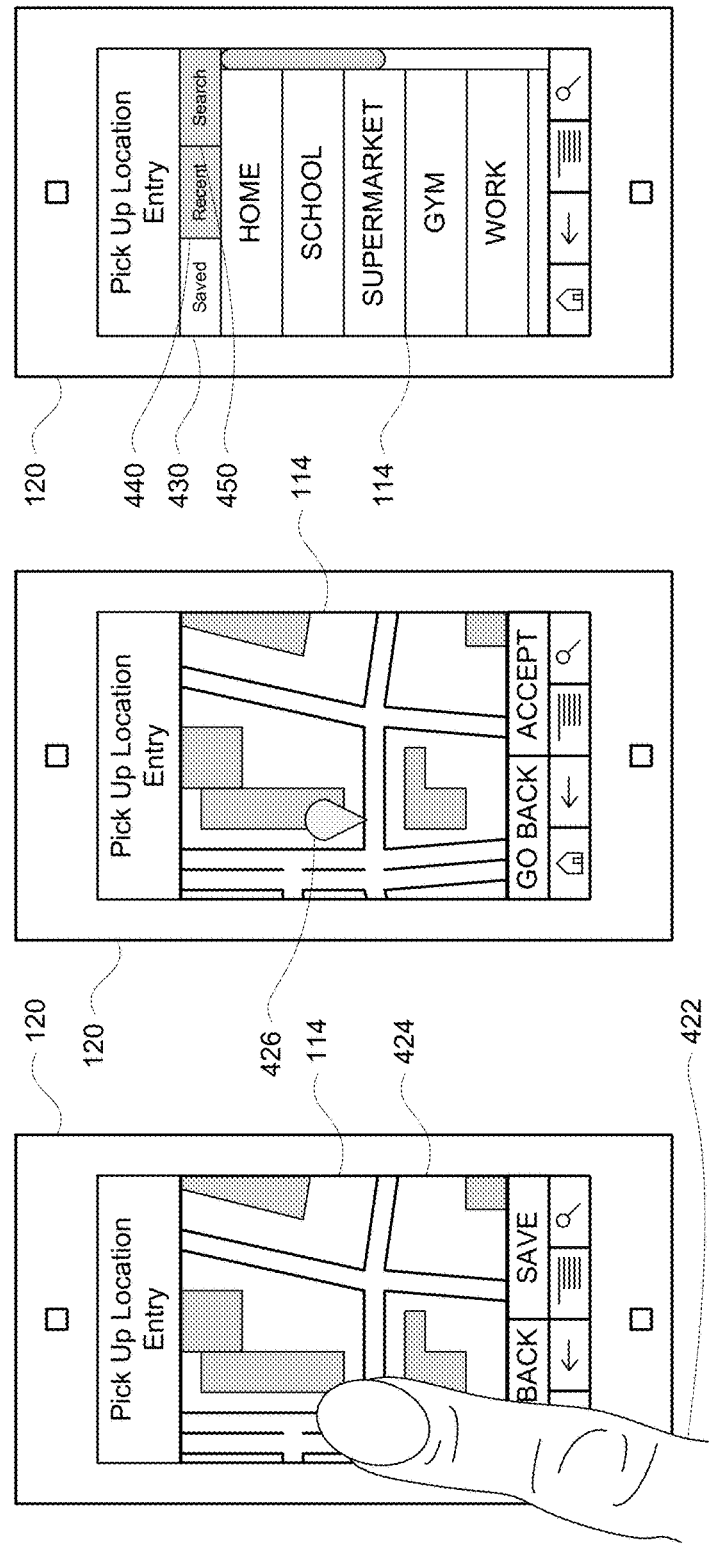
FIGS. 4A, 4B, and 4C are example client devices and screen shots in accordance with aspects of the disclosure.

These pickup and destination locations may be predefined (e.g., specific areas of a parking lot, etc.) or may simply be any location within a service area of the vehicles. As an example, a pickup location can be defaulted to current location of the user's client computing device, or can be input by the user at the user's client device. For instance, the user may enter an address or other location information or select a location on a map to select a pickup location. As shown in FIG. 4A, user 122 may use his or her finger 422 to tap on a map 424 displayed on the display 114 of client computing device 120. In response, as shown in FIG. 4B, the location of the tap on the map, displayed as map marker 426, may be identified as a requested location. Allowing the user to input or select a location may be especially helpful where the user is not currently located at the pickup location but will be by the time the vehicle arrives.

In the example of FIG. 4C, a user is provided with a plurality of options for inputting locations. As shown, the user is able to select from a series of saved locations under a saved option 430 previously saved by the user as discussed above. The user may also be provided with option 440 which provide the user with the ability to view a list of recent locations. By selecting option 450, the user may be able to conduct a location search. For example, a user may enter a search query ("fast food restaurant" or "doctor doe" or "gas station near me") and receive a set of locations corresponding to the search query as with a typical map or location-based search engine.

Once the user has selected one or more of a pickup and/or destination locations, the client computing device 120 may send the location or locations to one or more server computing devices of the centralized dispatching system. In response, one or more server computing devices, uch as server computing device 110, may select a vehicle, for instance based on availability and proximity to the user. The server computing device may then dispatch the selected vehicle to pickup to the user by providing the vehicle with the pickup and/or destination locations specified by the user.

When a vehicle, such as vehicle 101, is dispatched to the user, the client computing device 120 can show information about where the pickup location will be. This information may be provided to the client computing device from the server computing device 110. For example, the server computing device 110 may access the information of storage system 150 in order to identify a map and determine a route along the map between the vehicle's current location and the pickup location. This information, along with a potential pickup area or zone as discussed below, may then be provided to the client computing device for display to a user. Once received by the client computing device, the information may be displayed as discussed below.

Figure 5:
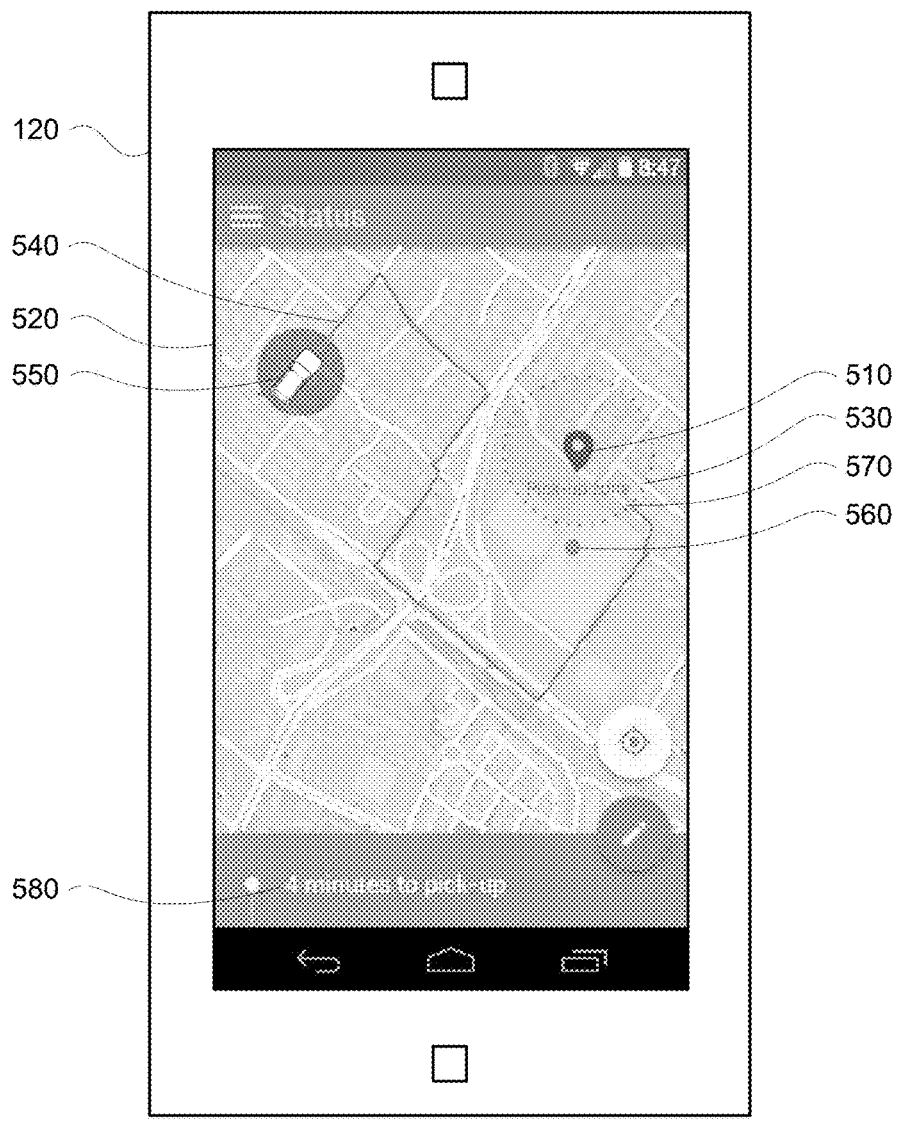
FIGS. 5-16 are various example screen shots and client computing devices in accordance with aspects of the disclosure.

Initially, the pickup location can be displayed in the client computing device 120 as a marker on a map. For example, as shown in example 500 of FIG. 5, a marker 510 corresponding to a preferred pickup location is displayed on map 520. A potential pickup zone 530 around the marker corresponding to a predetermined distance from the preferred pickup location may also be displayed. This potential pickup zone may indicate to the user where the pickup is likely to occur. In addition, the client device can display a path 540 between the vehicle 101's current location 550 and the pickup zone corresponding to a route received from the server computing device 110 which the vehicle will or is expected to travel to reach the user.

A further marker 560 can be used to identify the current location of the client device relative to the map 510. The location of the client computing device may be retrieved locally at the client computing device 120 for faster processing but may also be received from the server computing device 110.

Figure 6:
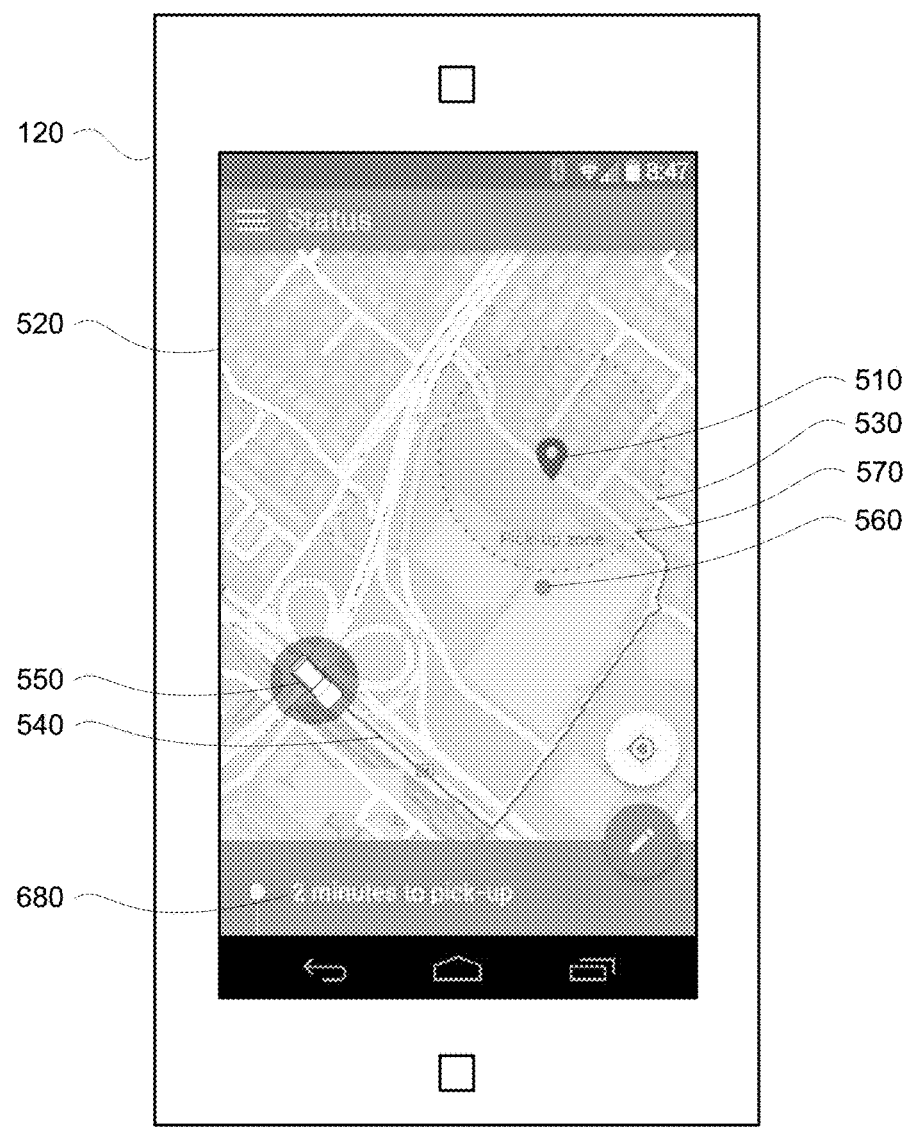
Figure 7:
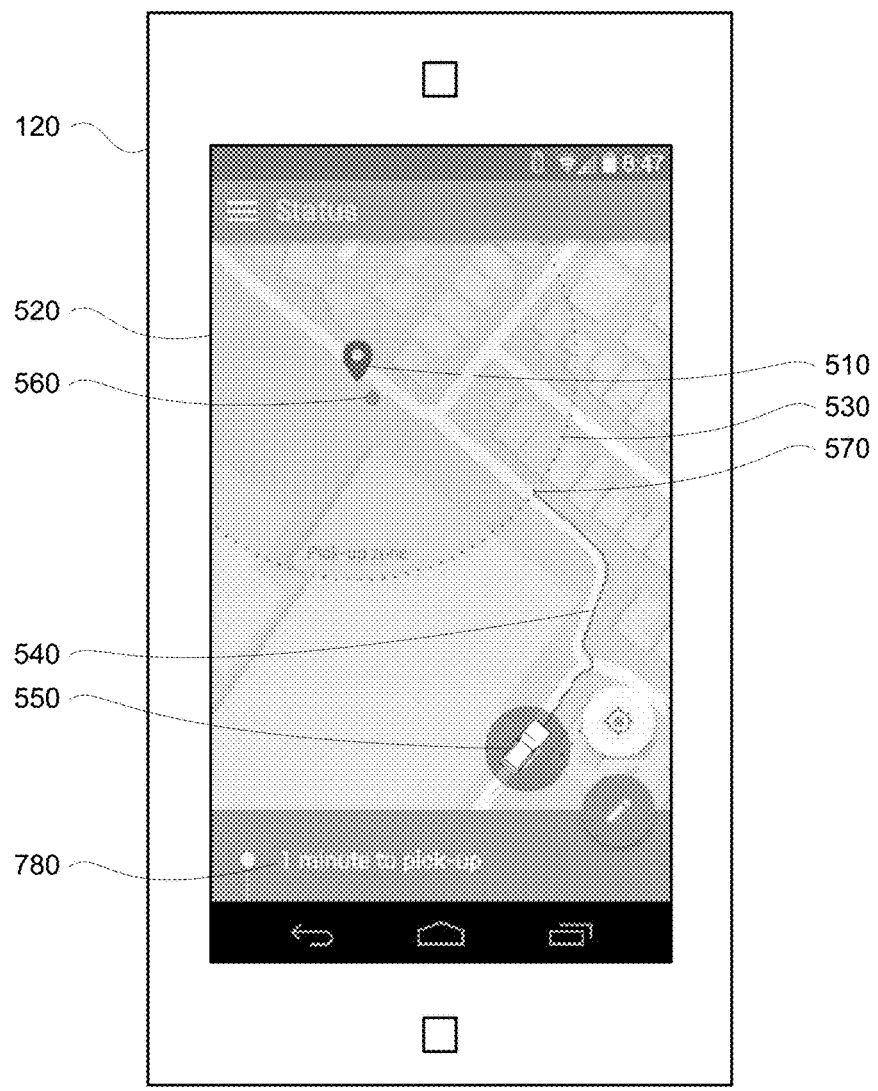

The information provided on the display of the client computing device may be updated as updates are received, for instance from the server computing devices 110 and/or the computing devices of vehicle 101. For example, the location of path 540, vehicle 101's current location 550, and the marker 560 corresponding to the current location of the user's client device may be updated as the client device 120 is moved as can be seen between FIGS. 6 and 7.

At the same time, information about the vehicle's status may also be provided based on the received updates. For example, FIG. 5 includes a notification 580 indicating the vehicle will reach the zone or the preferred pickup location in an estimated period of time. Similarly, FIGS. 6 and 7 include notifications 680 and 780 indicating that this estimated period of time has been updated. The currently displayed estimated period of time may be periodically determined locally at the user's client computing device or received by the user's client computing device from the vehicle's computing devices and/or the server computing devices and updated every minute or more or less to keep the display as relevant as possible to the user.

The predetermined distance from the preferred pickup location which defines the zone is greater than zero and may be defined in distance or travel time. For example, the predetermined distance may be 10 meters or more or less or 15 seconds at some predetermined speed (such as the speed limit of the roadway). In addition, the predetermined distance may be a radial distance, or simply a distance along a roadway extending away from the pickup location. In one example, the zone 530 may be shown as a shape such as a bubble wherein an edge or point of the shape is at least the predetermined distance from the pickup location.

As the vehicle 101 maneuvers along the path 540, the area of the map 510 may appear to zoom in towards the path to give the user further details about the zone where the vehicle is relative to the pickup location. For instance, as can be seen between FIGS. 5 and 6 and also between FIGS. 6 and 7, as the vehicle approaches the pickup location, the zoom level increased in order to keep the map visually relevant and pleasing to the user.

Returning to FIG. 5, to make the actual pickup spot appear more flexible, the path 540 can end at an edge of the pickup zone. In this regard, the path 540 does not continue into the space of the zone 530 but instead ends at point 570 along an edge of zone 530. In addition, by ending the path at the edge of the pickup zone, the client device is able to indicate clearly to the user that he or she may be able to intercept the vehicle at point 570 and also that the actual pickup location is a fluid concept subject to change according to the current traffic, parking conditions, etc.

Figure 8:
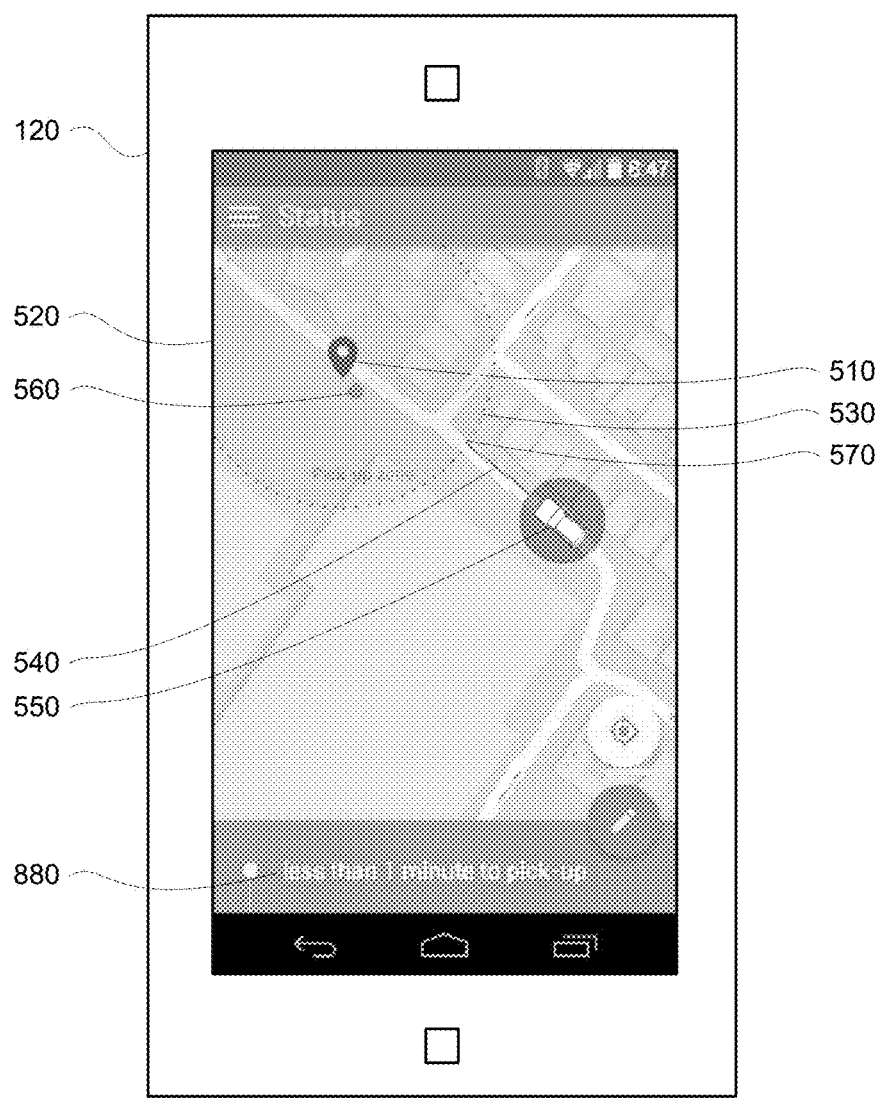
Figure 9:
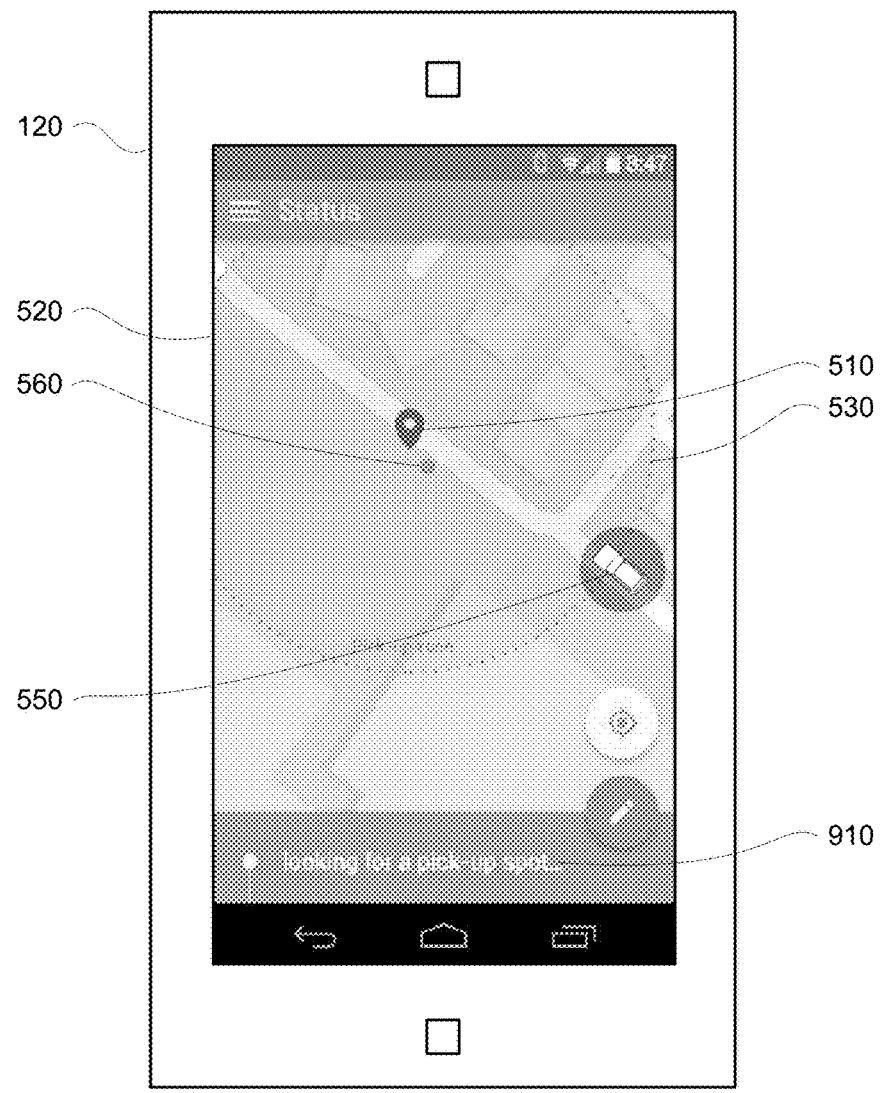

To keep the user clued into where the pickup location is most likely to occur, the size of the zone may be increased or decreased. As shown in the example of FIG. 8, as the vehicle reaches a certain distance such as less than 1 mile or 1 minute from the pickup zone along the route (as indicated by notification 880), the pickup zone 530 may decrease in size because the vehicle 101 is likely to have a better understanding of available parking spots within the zone from information received from the vehicle's perception system or other sources. This may allow the user to easily identify and focus on reaching the zone where the user is able to intercept vehicle 101. In addition, as shown in example 900 of FIG. 9, when the vehicle reaches the zone 530 on the map 510, the path 540 may no longer be displayed and the client computing device may display an indication 910 to the user that the vehicle is currently looking for a pickup spot.

Figure 10:
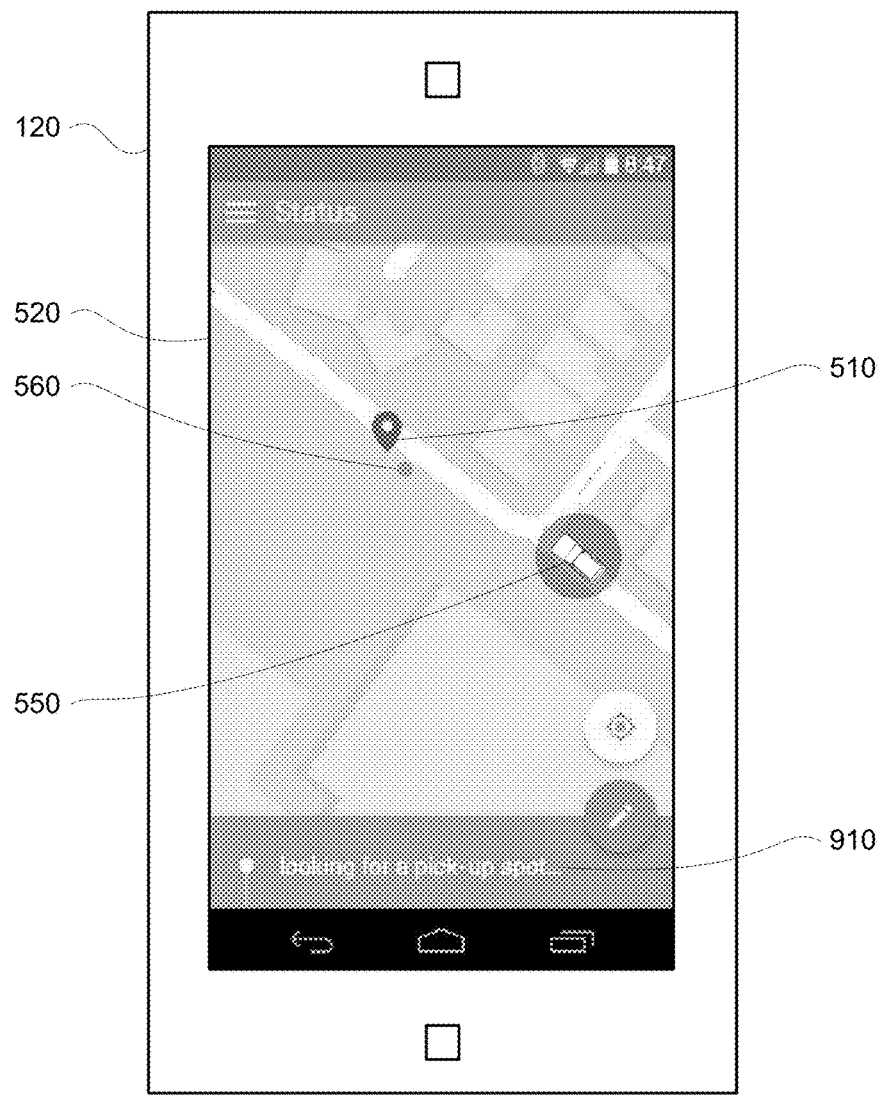
Figure 11:
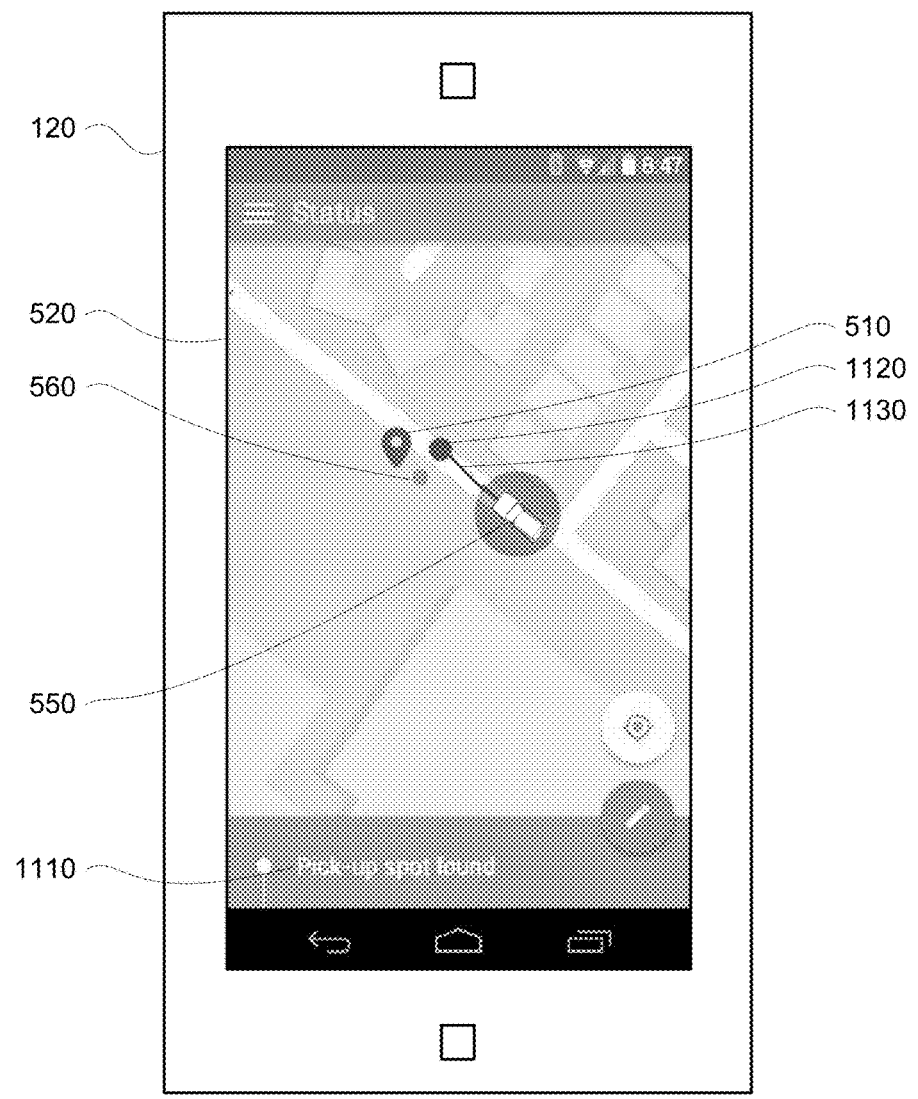

In one example, when the vehicle is within the zone 530 and looking for a potential spot to stop, the zone 530 may disappear altogether as shown in example 1000 of FIG. 10. When a spot to stop and wait for the user is found by the vehicle's computing devices, as indicated by indication 1110 shown in example 1100 of FIG. 11, the location may be identified by a new marker 1120 which identifies to the user where this new marker is in relation to the marker 510 or the original pickup location. In addition, a new path 1130 between the current location of the vehicle and the new marker 1120 may also be displayed.

Figure 12:
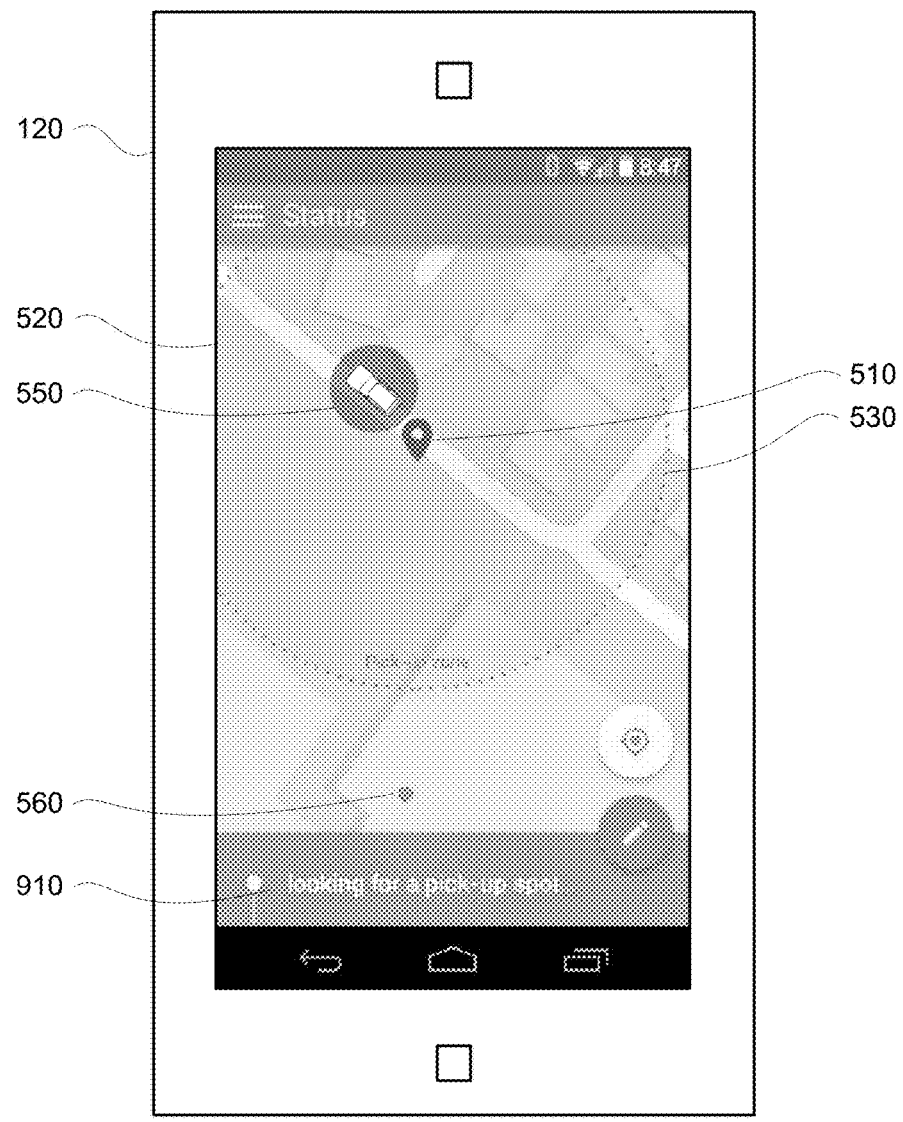
Figure 13:
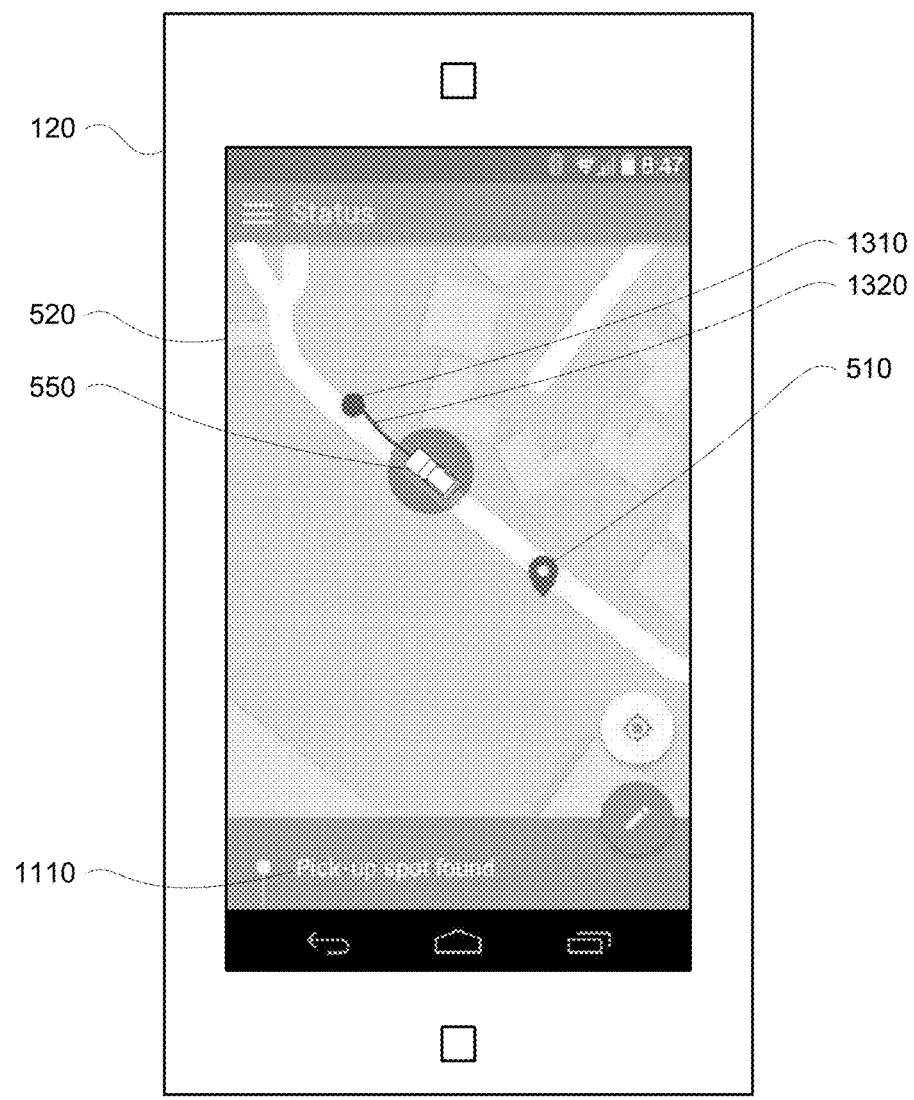

Alternatively, rather than disappearing, when the vehicle enters the pickup zone, the zone may remain as shown in example 1200 of FIG. 12, and the notification 910 may continue to be displayed. In this example, the zone 530 may persist, even where the vehicle has passed the pickup location. In some variations, the zone 530 may then disappear once the vehicle has identified a spot to stop and wait for the user as discussed above and shown in example 1300 FIG. 13. Again, at this time, notification 1110 may be displayed to indicate that the vehicle's computing devices have found a spot to stop and wait for the user.

In some examples, once a vehicle enters the pickup zone at one edge and as the vehicle approaches or gets close to another edge of the zone, the size of the zone on the user's client device relative to the map may be increased. This lets the user know that he or she may have to go a bit farther from the desired pickup location, but may still maintain the position of the preferred pickup location within the pickup zone.

In another example, once the vehicle recognizes a potential spot to stop and wait for the user, the zone 530 may start to shrink towards that spot. This indicates to the user that he or she should move towards the center of the shrinking zone rather than towards the preferred pickup location. The shrinking may also occur after the vehicle has begun to park or when the vehicle is actually in the spot.

Figure 14:
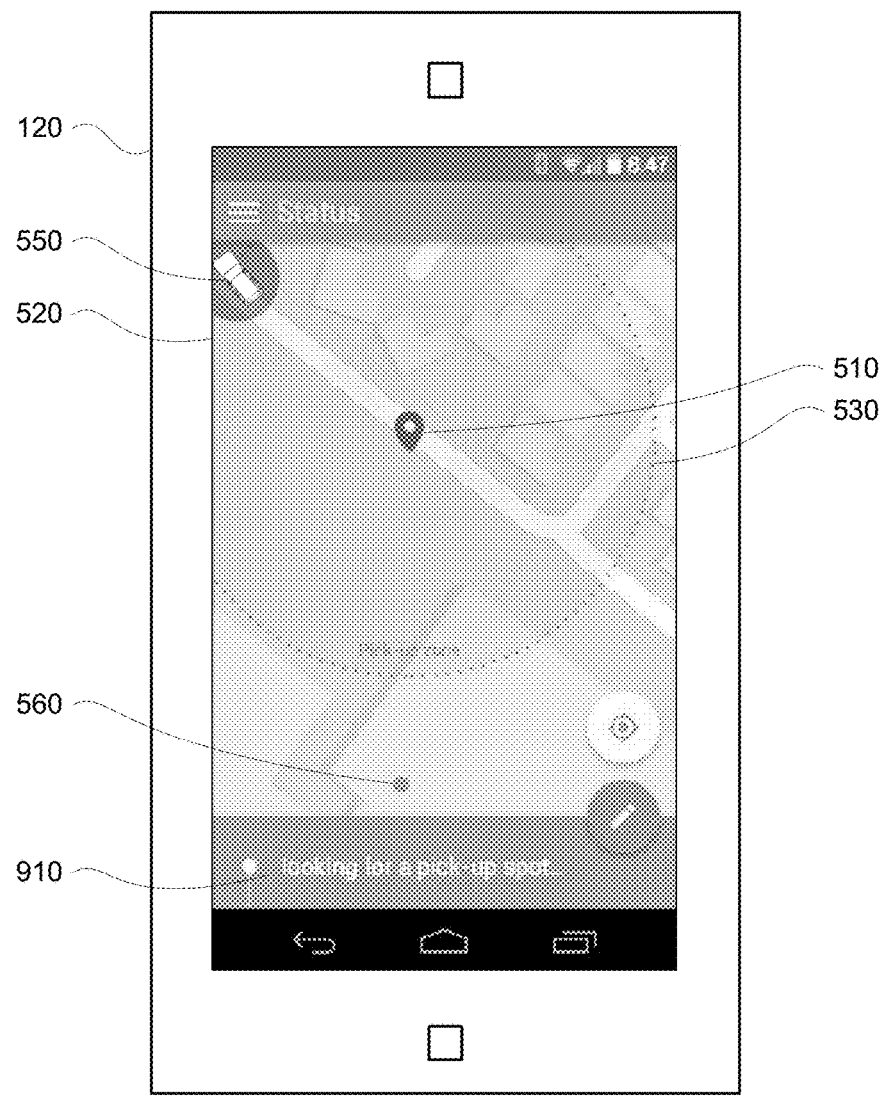

In some cases, the vehicle will be unable to find a place to stop within the zone 530 as shown in example 1400 of FIG. 14. In this case, the notification 910 may continue to be displayed. In addition, the zone may remain at its current size or return to the zone corresponding to the predetermined distance from the preferred pickup location, as shown in example 1500 of FIG. 15.

Figure 15:
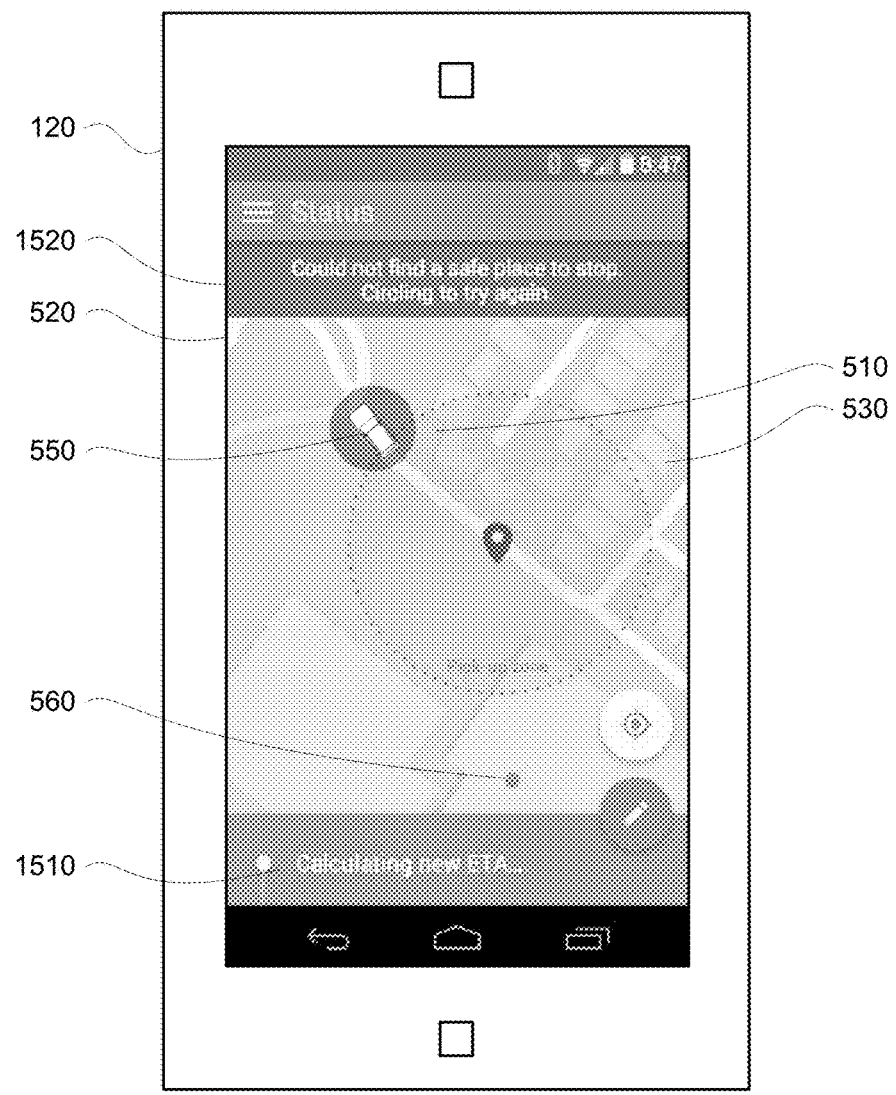
Figure 16:
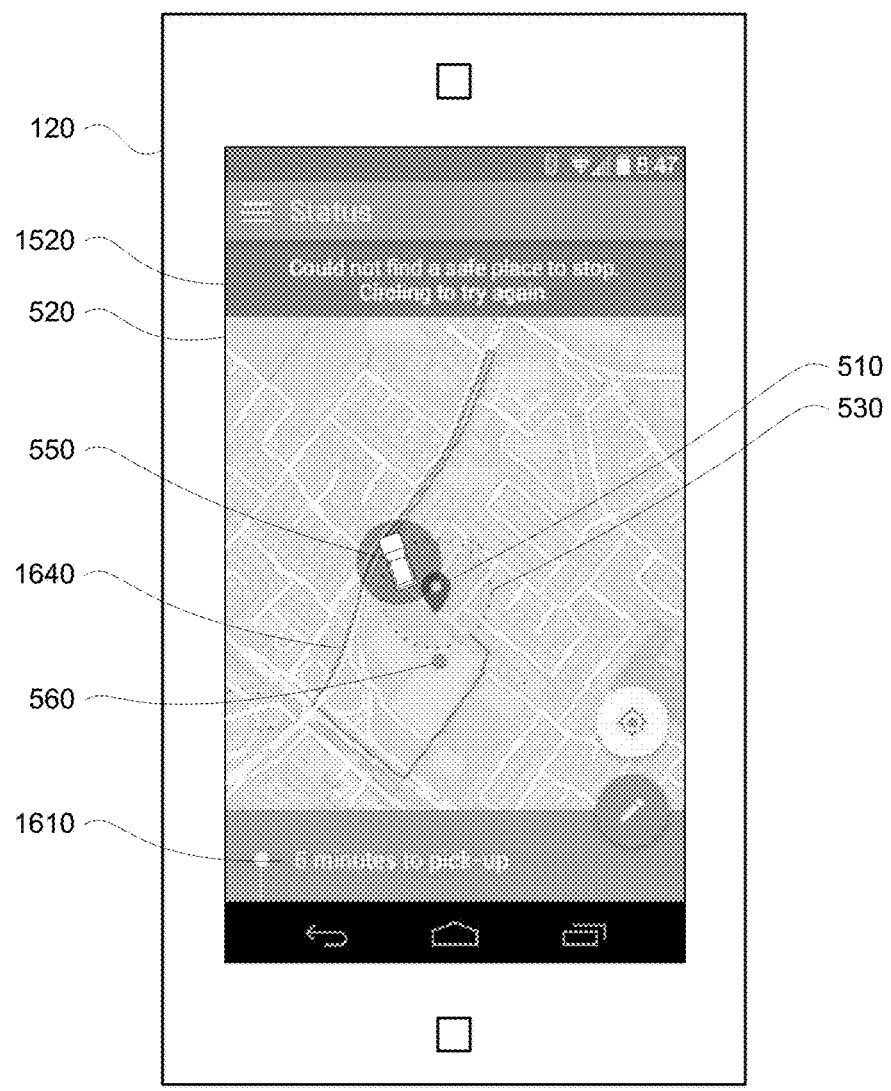

Once the vehicle exits the zone 530, as shown in FIG. 15, the vehicle 101 may circle or otherwise maneuver itself back around towards the pickup location. In this example, the client computing device may display notification 1510 indicating that a new route and a corresponding estimated time until the vehicle reaches the preferred pickup location or the zone is being recalculated. Again this recalculation may be done locally at the client computing device 120 or remotely at the vehicle 101 and/or the server computing devices 110. In addition, a second notification 1520 may indicate that the vehicle could not find a safe place to stop and must try again. At this point, a new route to the preferred pickup location or the zone is also being recalculated Once a new route is calculated, a new path 1640 corresponding to the new route may be displayed as shown in example 1600 of FIG. 16. Here, notification 1610 is displayed to indicate the current estimated time that the vehicle will reach the preferred pickup location and/or the zone. At the same time, the vehicle may attempt to reach the zone 530 in order to pick up the user as discussed above.

The aforementioned features may also be useful when a vehicle is attempting to drop off a passenger at a destination. For instance, as the vehicle approaches a destination point, the client device may display a map with a route to the destination identified by a map pin. A zone may be drawn some distance around this map pin in order to identify to the user that the vehicle could potentially stop anywhere within the zone. In some examples, as the vehicle approaches the zone and begins to detect the availability of places for the vehicle to safely stop, the zone may again increase in size. Once the vehicle has identified a location within the zone for the vehicle to stop, the location may be identified by a new marker which identifies to the user where this new marker is in relation to the map pin which indicated the original destination. At the same time, the zone may disappear to indicate to the user that the vehicle is no longer looking for a place to stop.

Figure 17:
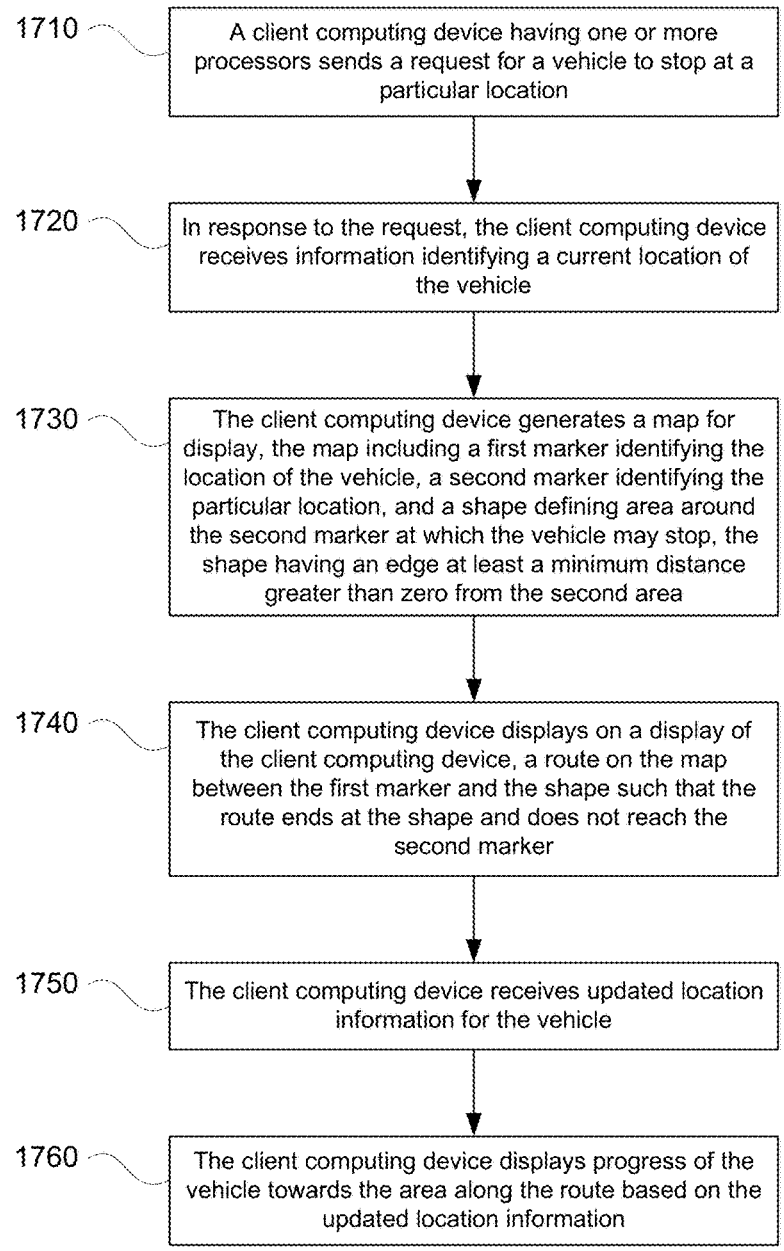
FIG. 17 is an example flow diagram in accordance with aspects of the disclosure.

FIG. 17 is an example flow diagram 1900 in accordance with some of the aspects described above that may be performed by one or more computing devices such as client computing device 120. For example, at block 1710 a client computing device having one or more processors sends a request for a vehicle to stop at a particular location. In response to the request, the client computing device receives information identifying a current location of the vehicle at block 1720. The client computing device then generates a map for display at block 1730. The map includes a first marker identifying the location of the vehicle, a second marker identifying the particular location, and a shape defining an area around the second marker at which the vehicle may stop. The shape has an edge at least a minimum distance greater than zero from the second marker. The client computing device displays on a display of the client computing device, a route on the map between the first marker and the shape such that the route ends at the shape and does not reach the second marker at block 1740. The client computing device receives updated location information for the vehicle at block 1750 and displays progress of the vehicle towards the area along the route based on the updated location information at block 1760.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
sending, by a client computing device having one or more processors, a request for a vehicle to stop at a particular location;
in response to the request, receiving, by the client computing device, information identifying a current location of the vehicle;
generating, by the client computing device, a map for display, the map including a first marker identifying the location of the vehicle, a second marker identifying the particular location, and a shape defining an area around the second marker at which the vehicle may stop, the shape having an edge at least a minimum distance greater than zero from the second marker;
displaying, by the client computing device, on a display of the client computing device, a route on the map between the first marker and the shape such that the route ends at the shape and does not reach the second marker;

receiving, by the client computing device, updated location information for the vehicle; and displaying, by the client computing device, on the display progress of the vehicle towards the area along the route based on the updated location information.

2. The method of claim 1, further comprising:

determining a current location of the client computing device; and displaying with the map a third marker indicating the current location of the client computing device in order to indicate to a potential passenger the location of the client computing device relative to a pickup location, the area, and the vehicle.

3. The method of claim 2, wherein the particular location is a pickup location for the potential passenger.

4. The method of claim 3, when the vehicle identifies a pickup spot within the area, displaying a fourth marker identifying the pickup spot relative to the second marker.

5. The method of claim 3, further comprising when the progress of the vehicle depicts the vehicle entering the area, no longer displaying the area.

6. The method of claim 4, when the vehicle identifies a pickup spot within the area, shrinking the area on the display towards the fourth marker.

7. The method of claim 1, further comprising, when the progress of the vehicle depicts the vehicle at a certain point within the area, increasing the size of the area on the display.

8. The method of claim 1, further comprising displaying, in conjunction with the progress, a status indicator indicating whether the vehicle is currently looking for a spot within the area to stop the vehicle.

9. The method of claim 1, further comprising displaying, in conjunction with the progress, a status indicator indicating whether the vehicle has found a spot within the area to stop the vehicle.

10. The method of claim 1, further comprising:

when the progress of the vehicle depicts the vehicle at a certain point relative to the area, displaying an indication that the vehicle was unable to find a spot within the area to stop; and displaying a new route towards the area.

11. A system comprising:

a display;

one or more processors configured to:

send a request for a vehicle to stop at a particular location;

in response to the request, receive information identifying a current location of the vehicle;

generate a map for display, the map including a first marker identifying the location of the vehicle, a second marker identifying the particular location, and a shape defining an area around the second marker at which the vehicle may stop, the shape having an edge at least a minimum distance greater than zero from the second marker;

display, on the display, a route on the map between the first marker and the shape such that the route ends at the shape and does not reach the second marker;

receive updated location information for the vehicle; and display, on the display, progress of the vehicle towards the area along the route based on the updated location information.

12. The system of claim 11, wherein the one or more processors are further configured to:

determine a current location of the client computing device; and display with the map a third marker indicating the current location of the client computing device in order to indicate to a potential passenger the location of the client computing device relative to a pickup location, the area, and the vehicle.

13. The system of claim 12, wherein the particular location is a pickup location for the potential passenger.

14. The system of claim 13, wherein the one or more processors are further configured to when the vehicle identifies a pickup spot within the area, display a fourth marker identifying the pickup spot relative to the second marker.

15. The system of claim 13, wherein the one or more processors are further configured to, when the progress of the vehicle depicts the vehicle entering the area, no longer display the area.

16. The system of claim 14, wherein the one or more processors are further configured to when the vehicle identifies a pickup spot within the area, shrink the area on the display towards the fourth marker.

17. The system of claim 11, wherein the one or more processors are further configured to, when the progress of the vehicle depicts the vehicle at a certain point within the area, increase the size of the area on the display.

18. The system of claim 11, wherein the one or more processors are further configured to display, in conjunction with the progress, a status indicator indicating whether the vehicle is currently looking for a spot within the area to stop the vehicle.

19. The system of claim 11, further comprising the vehicle.

20. A non-transitory, tangible, computer readable medium on which instructions are stored, the instructions, when executed by one or more processors, cause the one or more processors to perform a method, the method comprising:

sending a request for a vehicle to stop at a particular location;

in response to the request, receiving information identifying a current location of the vehicle;

generating a map for display, the map including a first marker identifying the location of the vehicle, a second marker identifying the particular location, and a shape defining an area around the second marker at which the vehicle may stop, the shape having an edge at least a minimum distance greater than zero from the second marker;

displaying, on the display, a route on the map between the first marker and the shape such that the route ends at the shape and does not reach the second marker;

receiving updated location information for the vehicle; and displaying, on the display, progress of the vehicle towards the area along the route based on the updated location information.

* * * * *